May 19, 1931.　　　　L. S. PETERSON　　　　1,806,116
HEDGE TRIMMER
Filed April 22, 1930　　2 Sheets-Sheet 1
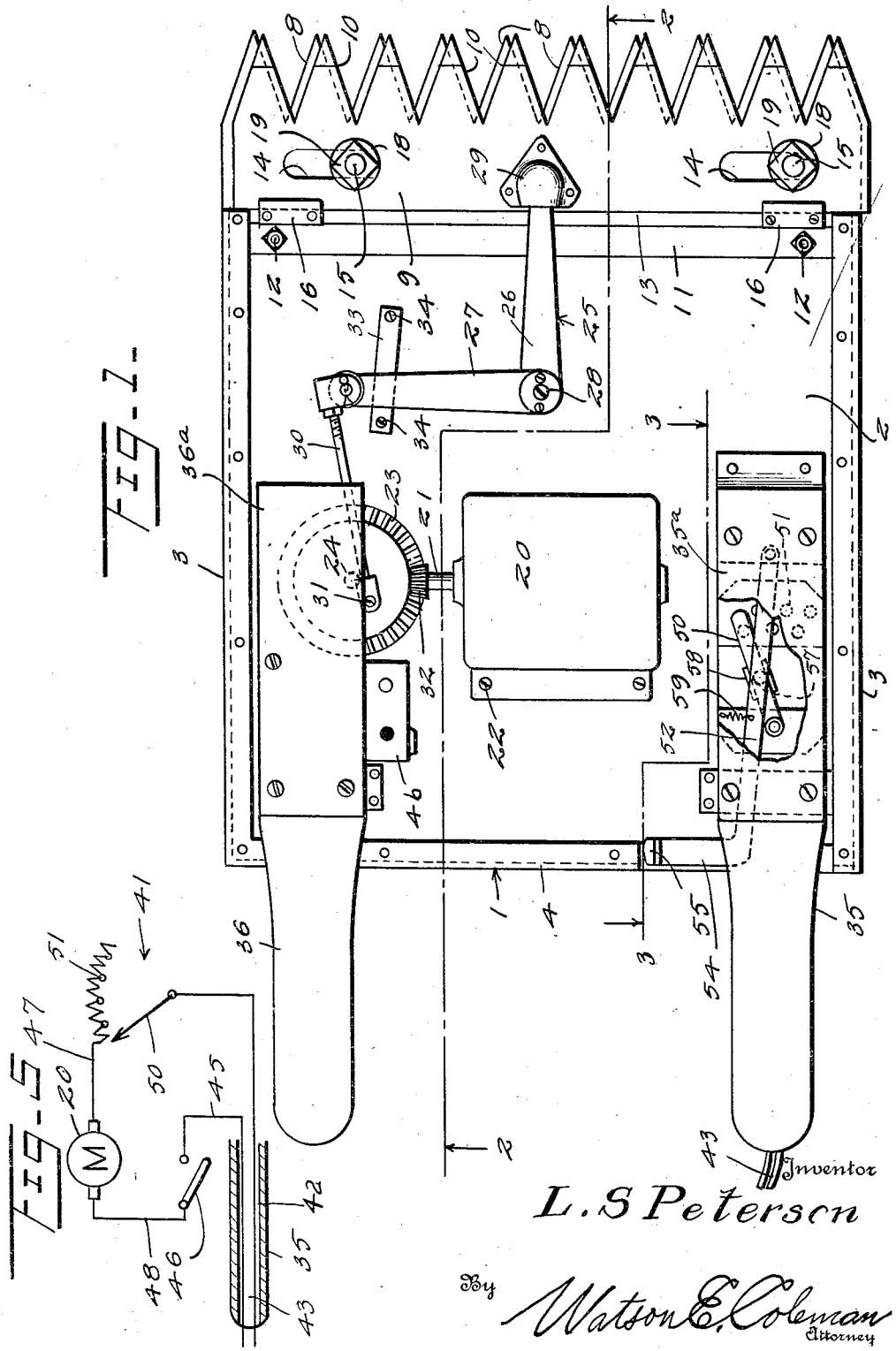
Inventor
L. S. Peterson
By Watson E. Coleman
Attorney

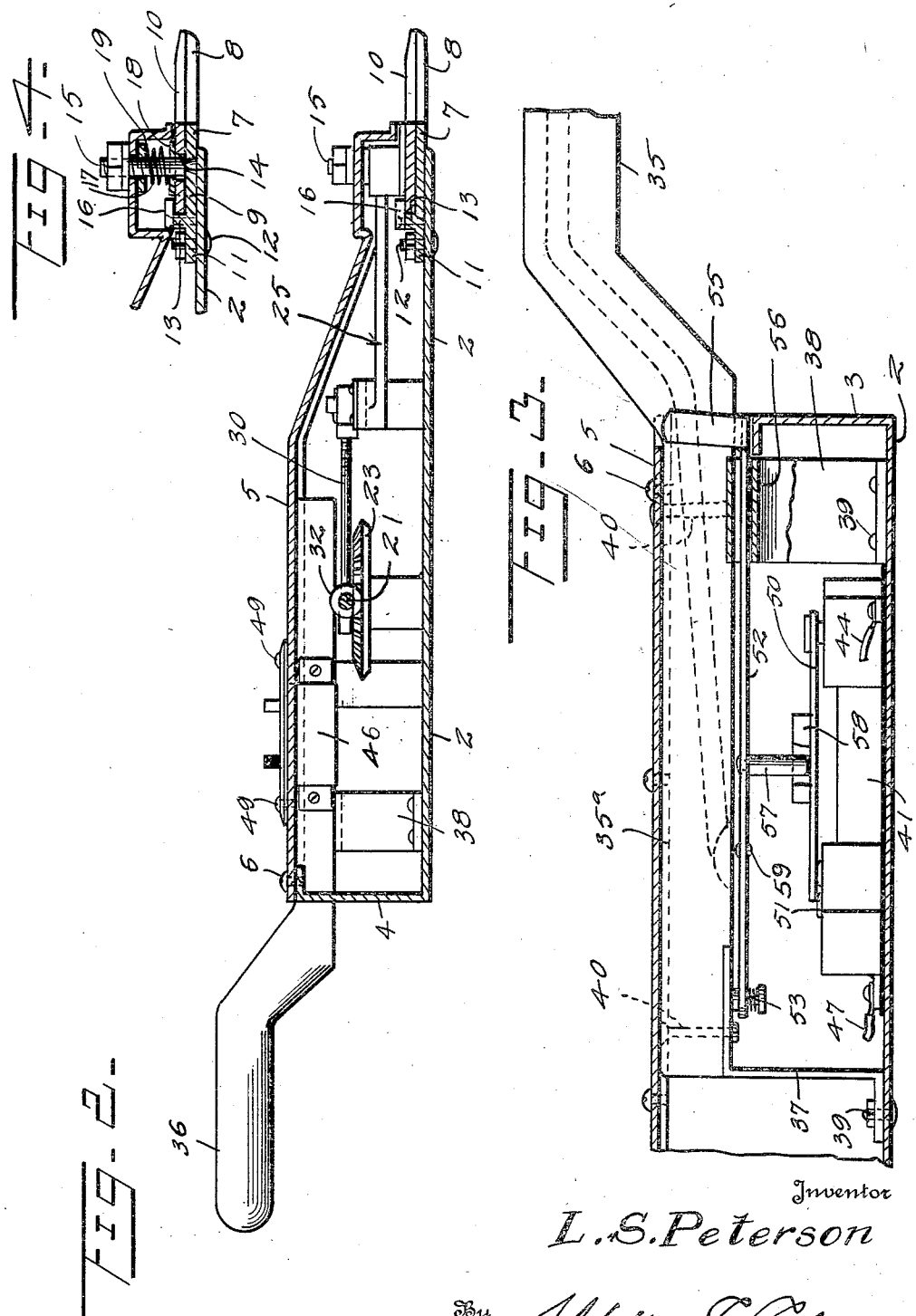

Patented May 19, 1931

1,806,116

UNITED STATES PATENT OFFICE

LOGAN S. PETERSON, OF McKEESPORT, PENNSYLVANIA

HEDGE TRIMMER

Application filed April 22, 1930. Serial No. 446,344.

This invention relates to hedge trimmers of that type embodying cutting mechanism consisting of fixed and movable bars carrying teeth, and operating mechanism consisting of a motor and means connecting the motor to the movable bar.

The invention has for one of its objects to provide a hedge trimmer of the character stated which shall embody novel and simple means adapted to maintain the movable bar and its teeth in proper relation to the fixed bar and its teeth and adapted to be adjusted to compensate for any wear occurring in the contacting surfaces of the bars and teeth.

The invention has for a further object to provide a hedge trimmer of the character stated wherein the means for connecting the motor to the movable bar shall embody elements of such construction and so arranged with respect to each other and to the fixed and movable bars as to permit them and the motor to be housed in a comparatively short and shallow casing.

The invention has for a further object to provide a hedge trimmer of the character stated which shall embody means through the medium of which the speed of the motor may be easily and quickly varied.

The invention has for a still further object to provide a hedge trimmer of the character stated which shall embody handles extending rearwardly from the casing and of which one shall be provided with a longitudinal passage for the reception of the motor lead extensions through the medium of which the motor is connected to a source of current.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a top plan view of the hedge trimmer with the cover of its casing removed;

Figure 2 is a sectional view taken on the planes indicated by the line 2—2 of Figure 1;

Figure 3 is a sectional view taken on the planes indicated by the line 3—3 of Figure 1;

Figure 4 is a sectional view taken on a plane extending transversely through the cutting mechanism, and Figure 5 is a diagrammatic view of the motor of the apparatus and the motor controlling means.

The hedge trimmer comprises a comparatively short and shallow casing 1 which is of rectangular formation in plan. The bottom wall 2, side walls 3, and the rear end wall 4 of the casing 1 are fixedly connected together, and top wall 5 of the casing is removably secured in place by screws 6.

A cutting mechanism is located at and extends across the front end of the casing 1 and comprises a fixed lower bar 7 provided at its front edge with teeth 8, and a movable upper bar 9 provided at its front edge with teeth 10, the teeth being similar and gradually decreasing in width in the direction of their front ends. The fixed bar 7 is provided with a rearwardly directed extension 11 which extends longitudinally thereof and rests upon and is secured, as at 12, to the bottom wall 2 of the casing 1. The fixed bar 7 is provided with a rib 13 which extends longitudinally and upwardly therefrom at its juncture with its extension 11.

The movable bar 9 rests upon the fixed bar 7 with its rear edge in contact with the rib 13, and is provided with longitudinally extending slots 14 for the reception of posts 15 carried by and extending upwardly from the fixed bar. Flanges 16 carried by the rib 13 and bearing against the upper side of the movable bar 9, and springs 17 carried by the posts 15 and bearing against the movable bar, provide means for holding the movable bar against vertical displacement from the fixed bar 7. The springs 17 rest at their lower ends upon washers 18 mounted upon the posts 15 and in turn resting upon the movable bar 9. Nuts 19 mounted on the posts 15 and contacting with the upper ends of the springs 17, provide means by which the tension of the springs may be varied to take up any wear occurring in the contacting faces of the bars 7 and 9 and teeth 8 and 10.

An electric motor 20 is arranged centrally in the casing 1 with its armature shaft 21 parallel to the bars 7 and 9, and is secured to the bottom wall 2 of the casing, as at 22. Means for connecting the motor 20 to the movable bar 9 comprises a ring gear 23 which is arranged in the casing 1 at the left hand side of the motor 20, and is supported by a shaft 24 for rotation in a plane parallel to the plane of the bottom wall 2 of the casing, this shaft being alined with the armature shaft 21. This means also comprises an angle lever 25 which is pivoted at the juncture of its arms 26 and 27 within the casing 1. The pivot 28 of the lever 25 is arranged forwardly of the motor 20 and at the longitudinal center of the casing 1. The arm 26 of the lever 25 extends forwardly from the pivot 28, and is loosely engaged in a socket member 29 secured to the upper side of the movable bar 9 at a point centrally between the ends of the bar. The arm 27 of the lever 25 extends to the left from the pivot 28, and has its free end connected by a rod 30 to a wrist pin 31 extending upwardly from the ring gear 23. A pinion 32 is fixed to the armature shaft 21 and engages the ring gear 23. A wear strip 33, upon which the free end of the lever arm 27 rests, is fixed, as at 34, to the bottom wall 2 of the casing 1.

Right and left handle bars 35 and 36, respectively, extend rearwardly from the casing 1 at opposite sides of the longitudinal center thereof, and have their front end portions or shanks 35a and 36a arranged within the casing and secured to and upon front brackets 37 and rear brackets 38. The brackets 37 ad 38 are secured, as at 39, to the bottom wall 2 of the casing 1, and the handle bar shanks 35a and 36a are secured, as at 40, to the brackets.

The brackets 37 and 38 extend upwardly from the casing wall 2 to support the handle bar shanks 35a and 36a above said wall and thus provide beneath said shanks room for the ring gear 23 and a rheostat 41, the gear being located below the shank 36a and the rheostat below the shank 35a.

The handle bar 35 and its shank 35a are provided with a longitudinally extending passage 42 for the reception of the front portion of a lead cord or cable 43 adapted to be connected to any suitable source of electric current. The conductor 44 of the cable 43 is connected to the rheostat 41, and the conductor 45 of the cable is connected to a switch 46. The rheostat 41 is connected by a conductor 47 to the motor 20, and the switch 46 is connected to the motor by a conductor 48. The switch 46 is arranged within the casing 1 close to the handle bar shank 36a, and is secured, as at 49, to the top wall or cover 5 of the casing, the switch being preferably of the push button type.

The rheostat 41 may be of any well known or appropriate construction, and embodies the usual pivoted blade 50 and contacts 51 to permit its resistance to be varied. The blade 50 is adapted to be adjusted to vary the resistance in the circuit of the motor 20 through the medium of a lever 52 which is positioned beneath a handle bar shank 35a. The lever 52 is pivotally connected at its front end, as at 53, to the front bracket 37 for this handle bar shank, and its rear end extends through an opening 54 in the rear casing wall 4.

The lever 52 is provided at its rear or free end with an upwardly extending arm 55 which is located at the inner lateral side of the handle bar 35 so as to permit the lever to be rocked through the medium of the thumb of the hand engaging this handle bar. The rear end of the lever 52 extends through the bracket 38 of the handle bar shank 35a and is supported by a bar 56 carried by and extending across this bracket. The blade 50 of the rheostat 41 is arranged in parallel relation to its operating lever 52, and it is connected to its operating lever by a fibre post 57 secured to and extending downwardly from the lever and slidably arranged in a guide 58 secured to the upper side of the blade. A coil spring 59 secured at one end to the handle bar shank 35a and at its other end to the lever 52, serves to normally maintain the blade 50 in position to include all of the resistance coils of the rheostat 41 in the circuit of the motor 20. The blade 50 is adapted to be moved from this position in a direction to cut one or more resistance coils of the rheostat 41 out of the circuit of the motor 20, and it is adapted to be thus moved through the medium of the lever 52. The actuation of the blade 50 through the medium of the lever 52 tensions the spring 59 so that when the lever is released, the spring functions to return the blade 50 to normal position, the movement of the blade by the spring being limited by the contact of the lever with one side of that bracket 38 through which the lever extends.

It should be apparent from the foregoing description, taken in connection with the accompanying drawings, that the hedge trimmer may be conveniently supported in a horizontal or vertical or inclined position while in use, that the operation of its cutting mechanism is under the control of a switch 46 which is within convenient reach of the hand grasping the handle bar 36, and that the rate of the operation of its cutting mechanism is under the control of the lever 52 which is within convenient reach of the hand grasping the handle bar 35. It will also be understood that all of the parts of the hedge trimmer are simple, durable and compactly assembled, and that the motor, the rheostat actuating means, the switch and the means for connecting the motor to the movable bar of the cutting mechanism are all housed and fully protected.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A hedge trimmer comprising a casing, cutting mechanism at the front end of the casing, an electric motor arranged in the center of the casing, brackets extending upwardly from the bottom wall of the casing at opposite sides of the motor, handle bars extending rearwardly from the casing and provided with shanks secured to the brackets, a ring gear rotatably mounted in the casing beneath one of the handle bar shanks and provided with a wrist pin, a pinion fixed to the armature shaft of the motor and meshing with the ring gear, an elbow lever pivoted at the juncture of its arms at the longitudinal center of the casing and forwardly of the motor, means connecting one arm of the lever to the cutting mechanism, a rod connecting the other arm of the lever to the wrist pin, a rheostat located below the other handle bar shank and including a movable blade, leads connecting the rheostat to the motor, a lever located below said other handle bar shank and pivoted to one of the brackets supporting the shank and limited in its movement in opposite directions by the other bracket of the shank, the lever extending through the rear end of the casing and provided at such end with an upstanding operating member, a guide secured to the blade, a post secured to the lever and engaging in the guide, and a spring secured at one end to said other handle bar shank and at its opposite end to the lever.

2. A hedge trimmer, comprising a casing, cutting mechanism at the front end of the casing, an electric motor in the casing, means connecting the motor to the cutting mechanism, a handle bar extending rearwardly from the casing, brackets extending upwardly from the bottom wall of the casing, a second handle bar extending rearwardly from the casing and provided with a shank secured to the brackets, a rheostat located below said shank and including a movable blade, leads connecting the rheostat to the motor, a lever located below said shank and pivoted to one of the brackets and limited in its movement in opposite directions by the other bracket, the lever extending through the rear end of the casing and provided at such end with an upstanding operating member, a guide secured to the blade, a post secured to the lever and engaging in the guide, and a spring secured at one end to said shank and at its other end to the lever.

In testimony whereof I hereunto affix my signature.

LOGAN S. PETERSON.